United States Patent
Stallman

[19]

[11] Patent Number: 6,044,563
[45] Date of Patent: Apr. 4, 2000

[54] ICE SCRAPER WITH RETRACTABLE CORD

[76] Inventor: Tammy A. Stallman, R.R. 1, Box 105, Beardsley, Minn. 56211

[21] Appl. No.: 09/264,146

[22] Filed: Mar. 5, 1999

[51] Int. Cl.[7] ........................................................ B26B 3/00
[52] U.S. Cl. .......................... 30/169; 15/236.06; 30/298.4
[58] Field of Search .................................. 30/169, 298.4; 15/236.06, 236.02

[56] References Cited

U.S. PATENT DOCUMENTS

| | | | |
|---|---|---|---|
| 4,041,564 | 8/1977 | Schlicher | 15/111 |
| 4,317,298 | 3/1982 | Mathers | 37/41 |
| 4,747,175 | 5/1988 | Durgin | 15/236.02 X |
| 4,779,089 | 10/1988 | Theus | 340/825.5 |
| 4,788,770 | 12/1988 | Simard | 30/169 |
| 5,257,510 | 11/1993 | Cox | 62/346 |
| 5,333,342 | 8/1994 | Huang | 30/169 |

*Primary Examiner*—Douglas D. Watts
*Attorney, Agent, or Firm*—Kinney & Lange, P.A.

[57] ABSTRACT

A device for scraping ice from the windows of a vehicle where the device includes a scraping blade, a handle, a holder and a cord. The cord attaches the scraper to the holder. The cord is attached to the interior bottom surface of the holder and is attached to a spring loaded reel contained within the handle making the cord retractable. A mechanism for locking the spring loaded reel in place is controlled by a mechanism external to a side of the handle.

17 Claims, 2 Drawing Sheets

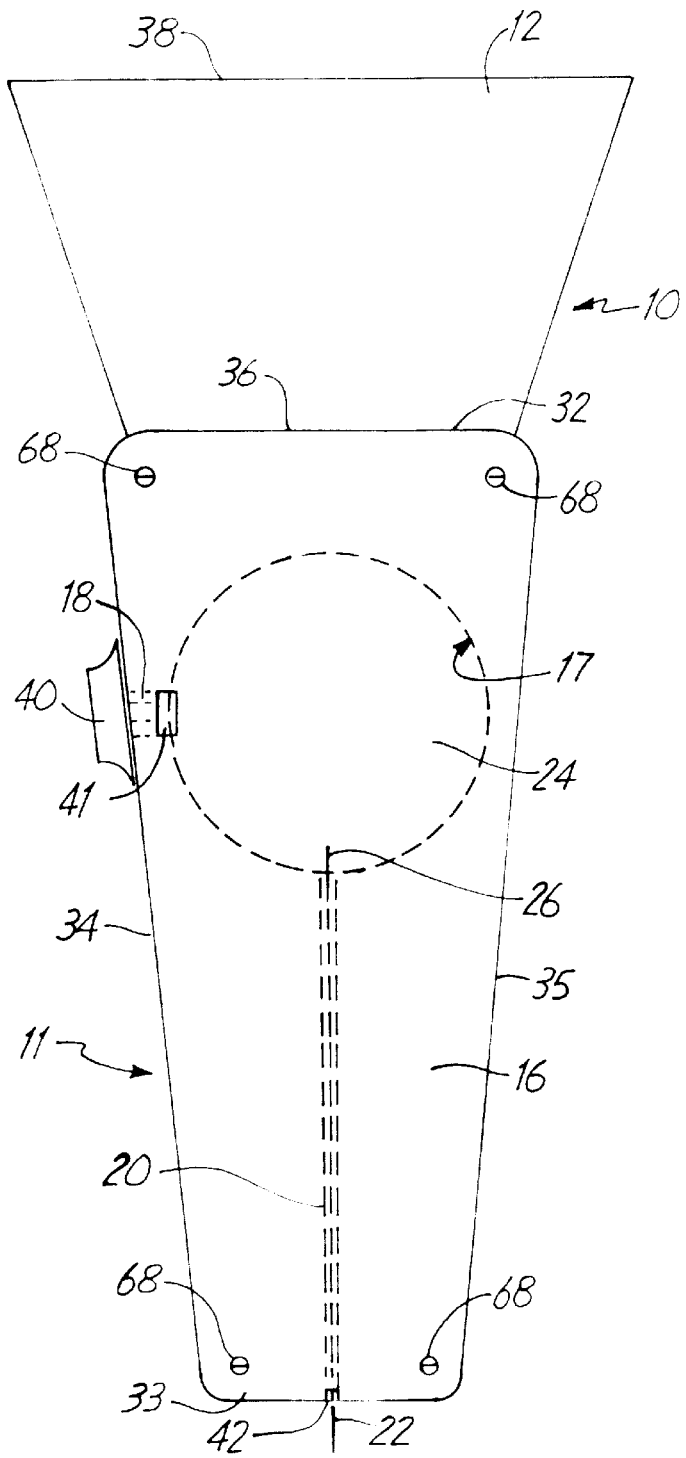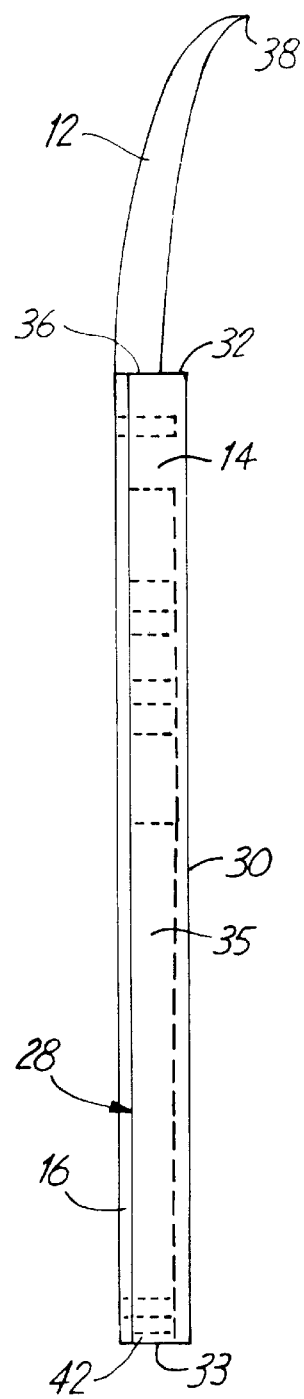

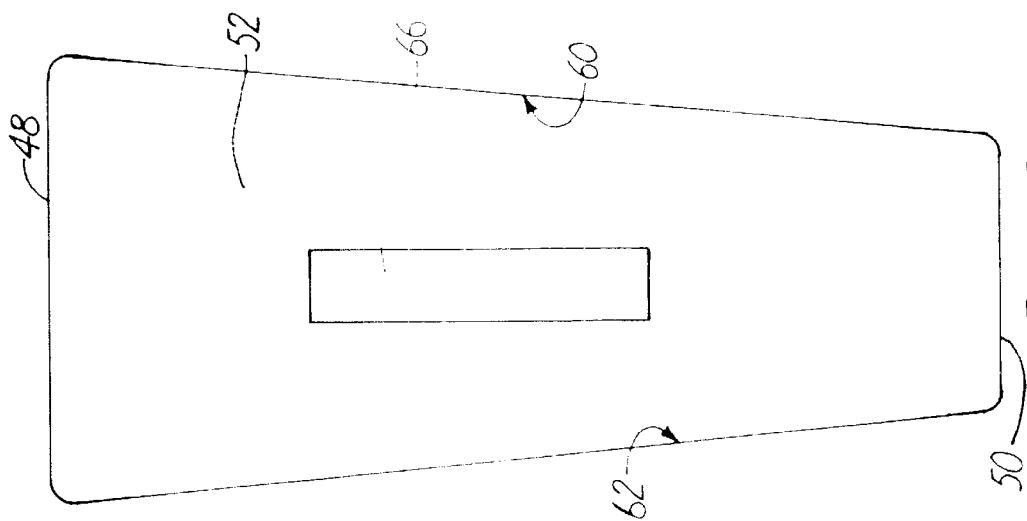
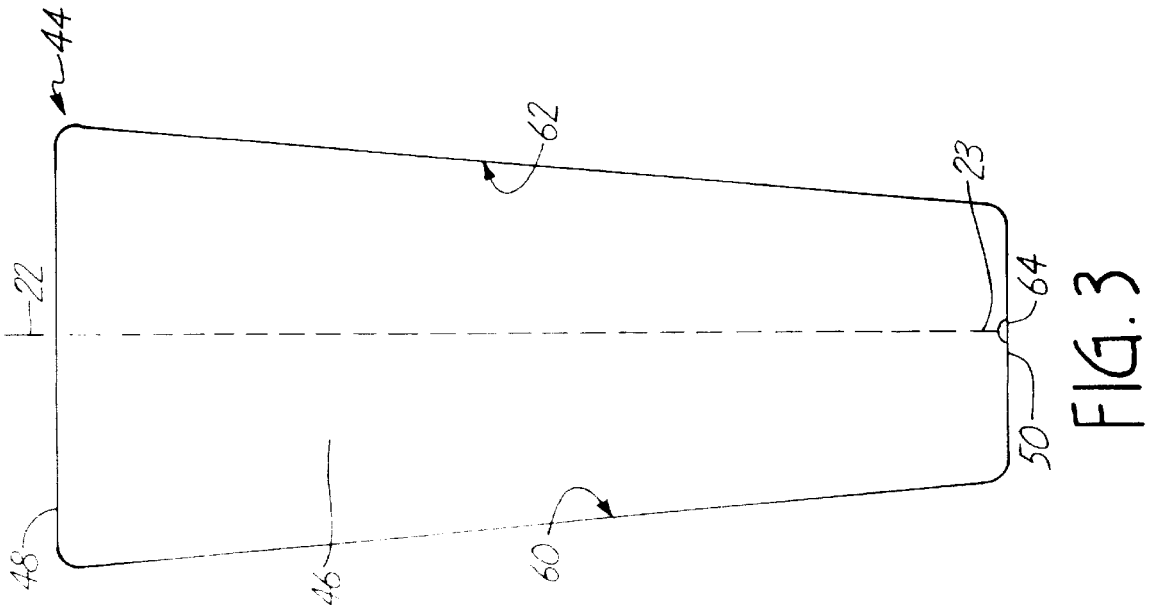

ICE SCRAPER WITH RETRACTABLE CORD

BACKGROUND OF THE INVENTION

The present invention pertains to an apparatus for scraping windows. In particular, the present invention relates to the scraping of ice from the windows on a vehicle.

Ice scrapers for windows on vehicles are known in the art. U.S. Pat. No. 4,041,564 discloses a scraper for cleaning windows on a vehicle. The scraper disclosed in U.S. Pat. No. 4,041,564 includes a brushing tool for removing snow and a scraping tool for removing ice. Additionally, the scraper disclosed in U.S. Pat. No. 4,041,564 discloses a telescoping handle whereby more coverage of a window can be made from a single standing point.

U.S. Pat. No. 4,683,592 discloses a combination ice scraper and mitt. The ice scraper can be inserted into a hole within the mitt. The mitt provides warmth to the hand of the user. The ice scraper disclosed in U.S. Pat. No. 4,683,592 includes an elongated member with a hand grip section and an opposite end with a beveled scraping edge.

U.S. Pat. No. 4,164,801 discloses an ice scraper with a handle section and a downward curved intermediate section. At the distal end of the downward curved intermediate section is a blade region with a plurality of downwardly curved resilient scraping fingers. The scraping section, including the resilient scraping fingers, is used to fracture ice which accumulates on the windows of a vehicle. By fracturing the ice, the surface of the windows is more easily cleaned.

U.S. Pat. No. 5,357,646 discloses a heated ice scraper. The scraping blade disclosed in U.S. Pat. No. 5,357,646 includes an electrically heated edge. The heat on the edge of the blade aids in loosening the ice, thereby making it easier to clear the windows on a vehicle.

U.S. Pat. No. 4,747,715 discloses an ice scraper with a unitary body. The scraper disclosed in U.S. Pat. No. 4,747,715 includes a handle with a hand grip. Additionally, the scraper disclosed includes a scraping edge and a squeegee edge. An optional feature disclosed for the scraper in U.S. Pat. No. 4,747,715 is a fabric loop fastener such as velcro for attaching the ice scraper to the fabric of a vehicle.

BRIEF SUMMARY OF THE INVENTION

The present invention includes an ice scraper for scraping a vehicle window. The ice scraper includes a scraping blade attached to a handle and a cord having one end attached to the handle and another end attached to the vehicle.

Preferably, the cord is wound on a reel when in a retracted state and can be drawn off the reel when the ice scraper is in use. The reel is preferably positioned within the handle of the scraper.

BRIEF DESCRIPTION OF THE DRAWINGS

FIG. 1 is a top view of a scraper of the present invention.

FIG. 2 is a side view of the scraper.

FIG. 3 is a top view of a holder for holding the scraper of the present invention.

FIG. 4 is a side view of the holder.

FIG. 5 is a bottom view of the holder.

DETAILED DESCRIPTION

An ice scraper is generally illustrated at 10 in FIGS. 1 and 2. The ice scraper 10 includes a handle 11 and a blade 12.

The handle 11 contains a base member 14 and a cover member 16, as illustrated in FIG. 2. The cover member 16 is adjacent to a top surface 28 of the base member 14.

The base member 14 includes a proximal end 32 and a distal end 33. The base member 14 of the handle 11 includes a circular indention 17 which is substantially centrally located between a first side surface 34 and a second side surface 35. The circular indention 17 is preferably located towards the proximal end 32 of the base member 14. A first channel 18 extends outwardly from the circular indention 17 through the first side surface 34. A second channel 20 extends downwardly from the circular indention 17 through a bottom surface 30 of the base member 14. The base member 14 and the cover 16 preferably are coated with a rubber type of material to aid in gripping the handle 11.

A spring loaded reel 24 is preferably contained within the circular indention 17 of the base member 14. A first end 26 of a cord 22 is attached to the spring loaded reel 24. The cord 22 is positioned through the second channel 20 within the base member 14 of the handle 11. The second channel 20 allows the cord 22 to be extracted from and retracted into the spring loaded reel 24 while providing the cord 22 with guidance.

A wear ring 42 is located within the second channel 20 substantially near the distal end 33 of the base member 14. The wear ring 42 prevents the cord 22 from fraying on the edges of the second channel 20 at the distal end 33 of the base member 14 when the cord 22 is extracted from and retracted into the spring loaded reel 24.

A second end 23 of the cord 22 is attached to a holder 44 by an attachment mechanism 64, preferably by a staple or a knot near the second end 23 of the cord 22. The cord 22 is preferably attached to a bottom surface 58 of the holder 44. The cord 22 is preferably made of a durable material such as nylon. The cord 22 is preferably thin enough such that doors on a vehicle can be shut while the ice scraper 10 is in use.

A locking lever 40 extends through the first channel 18 within the base member 14 of the handle 11. The locking lever 40 is manipulated to control a locking device 41 which, when engaged, prevents the spring loaded reel 24 from rotating. Such locking devices are well known in the art. By preventing the spring loaded reel 24 from rotating, the length of cord 22 extracted from the spring loaded reel 24 is fixed. The locking lever 40 is manipulated to disengage the locking device 41, thereby allowing the spring loaded reel 24 to rotate.

The cover member 16 is attached to the base member 14 by a plurality of fastening devices 68. The plurality of fastening devices 68 are preferably screws or rivets. The cover member 16 is aligned on the base member 14 such that the cover is adjacent to the top surface 28 of the base member 14. When the cover 16 is adjacent to the top surface 28 of the base member 14, apertures (not shown) located near the four corners of the base member 14 and the cover 16 are aligned. With the apertures in alignment, the plurality of fastening devices 68 secure the cover 16 to the base member 14.

The blade 12 contains a proximal end 36 and a distal end 38. The proximal end 36 of the blade 12 is attached to the proximal end 32 of the base member 14. The blade 12 is preferably curved toward the distal end 38. The curved distal end 38 of the blade 12 is tapered to provide a sharp edge for scraping ice from windows. The blade 12 is preferably made of a soft metal that will not scratch glass, such as brass, or a suitable other material which also will not scratch glass.

The holder 44 in which the scraper 10 is stored is a box-like structure with an open front end. The holder 44 includes a proximal end 48 and a distal end 50. The holder 44 is designed such that the distal end 33 of the handle 11 is inserted through the open end and into the holder 44 at the proximal end 48 of the holder 44. When the ice scraper 10 is contained within the holder 44, the distal end 33 of the handle 11 is substantially adjacent to the bottom surface 58 of the holder 44. When the ice scraper 10 is within the holder 44, the movement of the scraper 10 is confined by the box-like structure consisting of a front surface 46, a back surface 52, a first side surface 60 and a second side surface 62. The holder is preferably shaped such that the proximal end 48 is wider than the distal end 50 of the front surface 46 and the back surface 52, such that the holder 44 forms a wedge-shape with a consistent thickness, which is similar to the geometry of the handle 11.

Attached to the back surface 52 of the holder 44 is a velcro member 66. A companion piece of VELCRO® fastening material (not shown) is fastened to the interior of a vehicle where the holder 44 can be anchored to the interior of the vehicle by means of the VELCRO® fastening material member 66. By anchoring the holder 44 to the interior of the vehicle, the owner of the scraper 10 will know where the scraper 10 will be located within the vehicle because the cord 22 will retract the scraper 10 into the holder 44. Additionally, keeping the holder and scraper in one place will save the driver of the vehicle time in locating the scraper 10 when the windows need to be cleared.

Although the present invention has been described with reference to preferred embodiments, workers skilled in the art will recognize that changes may be made in form and detail without departing from the spirit and scope of the invention.

What is claimed is:

1. An apparatus for scraping vehicle windows, the apparatus comprising:
   a handle;
   a scraping blade attached to the handle; and
   a cord having a first end attached to the handle and a second end attached to the vehicle, wherein the first end of the cord is attached to the handle by a spring loaded reel which is contained within the handle.

2. The apparatus of claim 1 wherein the second end of the cord is attached to an apparatus holder.

3. The apparatus of claim 1 wherein the handle comprises:
   a base member comprising a top surface, a bottom surface, a proximal end, a distal end, a first side surface, and a second side surface, wherein the proximal end is wider than the distal end; and
   a cover which sits adjacent to the top surface and is attached to the base member.

4. The apparatus of claim 3 wherein a proximal end of the blade is attached to the proximal end of the handle wherein the distal end of the blade is curved and tapered to form a scraping blade.

5. The apparatus of claim 4 wherein the base member has an indention which cooperates with the spring loaded reel such that the top of the spring loaded reel is below the top surface of the base member, wherein the base member has a first channel extending from the circular indention through the first side surface, wherein the base member has a second channel extending from the indention through the bottom surface.

6. The apparatus of claim 5 wherein a lever extends through the first channel in the base member wherein a distal end of the lever which is external to the handle is manipulated to control a locking mechanism attached to the spring loaded reel.

7. The apparatus of claim 5 wherein the cord extends through the second channel.

8. The apparatus of claim 5 wherein the second channel at the distal end of the holder is a wear ring.

9. The apparatus of claim 2 wherein the apparatus holder comprises:
   a box-like structure with an open faced proximal end; and
   a closed distal end.

10. The apparatus of claim 9 wherein the apparatus holder cooperates with the apparatus such that when the apparatus is stored within the apparatus holder, the distal end of the handle is adjacent to the closed distal end.

11. The apparatus of claim 9 wherein the second end of the cord is attached to a bottom surface of the apparatus holder.

12. The apparatus of claim 10 wherein a velcro section is attached to a back surface of the apparatus holder, wherein the VELCRO® fastening material section cooperates with a velcro section attached to a vehicle.

13. An apparatus for scraping vehicle windows of a vehicle the apparatus comprising:
   a handle, wherein the handle includes a cavity and a first channel;
   a spring loaded reel disposed within the cavity;
   a scraping blade attached to the handle; and
   a cord having a first end attached to the spring loaded reel; and
   wherein the cord is contained within the first channel and wherein the second end of the cord is attachable to the vehicle.

14. The apparatus of claim 13 wherein the first end of the cord is attached to an apparatus holder that is attachable to the vehicle.

15. The apparatus of claim 13 wherein the handle comprises:
   a base member comprising a top surface, a bottom surface, a proximal end, a distal end, a first side surface, and a second side surface, wherein the proximal end is wider than the distal end; and
   a cover which sits adjacent to the top surface and is attached to the base member.

16. The apparatus of claim 15 wherein the base member includes a second channel extending from the cavity through the first side surface and a lever that extends through the second channel in the base member, the lever having a distal end which is external to the handle and is manipulable to control a locking mechanism attached to the spring loaded reel.

17. The apparatus of claim 13 wherein the first channel at the distal end of the holder includes a wear ring.

* * * * *